(12) United States Patent  
Nikitin

(10) Patent No.: US 7,375,932 B2  
(45) Date of Patent: May 20, 2008

(54) DISK DRIVE READ HEAD FOR READING CROSS-TRACK MAGNETIZATIONS

(75) Inventor: Vladimir Nikitin, Campbell, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 778 days.

(21) Appl. No.: 11/001,275

(22) Filed: Nov. 30, 2004

(65) Prior Publication Data

US 2006/0114617 A1    Jun. 1, 2006

(51) Int. Cl.  
*G11B 5/39* (2006.01)

(52) U.S. Cl. ............. 360/324.12; 360/324.11; 360/324.2; 360/319

(58) Field of Classification Search .......... 360/324.11, 360/324.12, 324.2, 317, 319  
See application file for complete search history.

(56) References Cited

U.S. PATENT DOCUMENTS

| | | | |
|---|---|---|---|
| 4,763,215 A | 8/1988 | Gueugnon | |
| 5,363,251 A | 11/1994 | Kamo et al. | |
| 5,576,915 A * | 11/1996 | Akiyama et al. | 360/314 |
| 5,583,725 A | 12/1996 | Coffey | |
| 5,590,009 A | 12/1996 | Ishida | |
| 5,768,075 A | 6/1998 | Bar-Gadda | |
| 5,796,561 A * | 8/1998 | Mauri | 360/324.11 |
| 5,973,891 A | 10/1999 | Neumann | |
| 6,313,969 B1 * | 11/2001 | Hattori et al. | 360/135 |
| 6,349,008 B1 | 2/2002 | Takayama | |
| 6,440,520 B1 | 8/2002 | Baglin | |
| 6,717,770 B1 | 4/2004 | Crawford | |
| 6,775,099 B2 | 8/2004 | Kuroda | |
| 2002/0044397 A1 | 4/2002 | Noma et al. | |
| 2003/0184922 A1 | 10/2003 | Taguchi | |

* cited by examiner

*Primary Examiner*—Jefferson Evans  
(74) *Attorney, Agent, or Firm*—Thomas R. Berthold

(57) ABSTRACT

A magnetoresistive read head is capable of reading cross-track magnetizations in a magnetic recording disk drive that has the magnetized regions or magnetizations in the magnetic recording layer of the disk oriented in the cross-track direction. The magnetic recording disk has the magnetizations in the concentric data tracks oriented in the radial or cross-track direction. The read head has its free-layer magnetization direction perpendicular to the disk surface and its pinned-layer magnetization direction parallel to the disk surface and orthogonal to the free-layer magnetization direction. The read head may have magnetic side shields spaced from it in the cross-track direction to prevent magnetic flux from adjacent data tracks from reaching the read head.

11 Claims, 15 Drawing Sheets

DISK DRIVE READ HEAD FOR READING CROSS-TRACK MAGNETIZATIONS

RELATED APPLICATIONS

This application is related to concurrently-filed application Ser. No. 11/001,399, now U.S. Pat. No. 7,079,343, titled "MAGNETIC RECORDING DISK DRIVE WITH DATA WRITTEN AND READ AS CROSS-TRACK MAGNETIZATIONS" and concurrently-filed application Ser. No. 11/001,265, pending, titled "DISK DRIVE WRITE HEAD FOR WRITING CROSS-TRACK MAGNETIZATIONS".

BACKGROUND OF THE INVENTION

1. Field of the Invention

This invention relates generally to magnetic recording disk drives.

2. Description of the Related Art

In conventional magnetic recording disk drives the disks have concentric data tracks with regions in the data tracks magnetized in the circumferential or along-the-track direction. Data is recorded or written when these regions are magnetized by an inductive write head. The write head has write poles that generate a magnetic write field across a write gap in the along-the-track direction as the disk rotates past the write head. The written data "bits" are the transitions between successive magnetized regions in the data tracks. These transitions result in magnetic fields that are generally perpendicularly into or out of the disk. The written data bits are read back when these fields are detected by a magnetoresistive read head and processed by the disk drive's circuitry into data as the disk rotates past the read head.

The conventional magnetic recording disk drive has an inherent limitation in data recording density because the magnetized regions are magnetized along-the-track. Because the magnetized regions along a data track magnetically oppose each in the along-the-track direction, each magnetized region is exposed to demagnetizing fields from adjacent magnetized regions which affect the stability of the recorded data. The effect of these demagnetizing fields becomes more pronounced as the data bits become smaller in an attempt to increase the bit density in the data tracks.

What is needed is a magnetic recording disk drive that can have increased data recording density because it does not suffer from the problem associated with demagnetizing fields along the data tracks.

SUMMARY OF THE INVENTION

The invention is a magnetoresistive read head capable of reading cross-track magnetizations in a magnetic recording disk drive that has the magnetized regions or magnetizations in the magnetic recording layer of the disk oriented in the cross-track direction.

The disk has a magnetic recording layer with a plurality of concentric data tracks magnetically separated from each other. The disk may be a discrete-track disk in which the magnetic separation of the data tracks is provided by concentric nonmagnetic guard bands interleaved with the concentric data tracks. Instead of a discrete-track disk, the disk may have the magnetic separation of the data tracks provided by concentric magnetic guard bands formed of the same magnetic material as the data tracks but containing circumferential or along-the-track magnetizations.

The inductive write head is supported on the disk drive head carrier with its write poles and write gap oriented to generate magnetic fields in the cross-track direction as the disk rotates past the write head. If the disk has magnetic guard bands containing along-the-track magnetizations, then the write head also has an erase pole spaced from one of the write poles by an erase gap, with the erase pole and erase gap oriented to generate magnetic fields in an along-the-track direction on the sides of the data track to magnetically separate the radially adjacent data tracks.

The magnetoresistive read head has a free ferromagnetic layer and a pinned ferromagnetic layer separated by a nonmagnetic spacer layer. The read head is supported on the disk drive head carrier with the free-layer magnetization direction perpendicular to the disk surface and the pinned-layer magnetization direction parallel to the disk surface and orthogonal to the free-layer magnetization direction. The magnetization direction of the free layer rotates relative to the fixed magnetization direction of the pinned layer when exposed to magnetic fields from the cross-track magnetizations in the data tracks. The read head may be located between two magnetic side shields that are spaced from the read head in the radial direction so that when data is being read magnetic flux from adjacent data tracks is prevented from reaching the read head.

For a fuller understanding of the nature and advantages of the present invention, reference should be made to the following detailed description taken together with the accompanying figures.

DETAILED DESCRIPTION OF THE INVENTION

Prior Art

Figure 1:
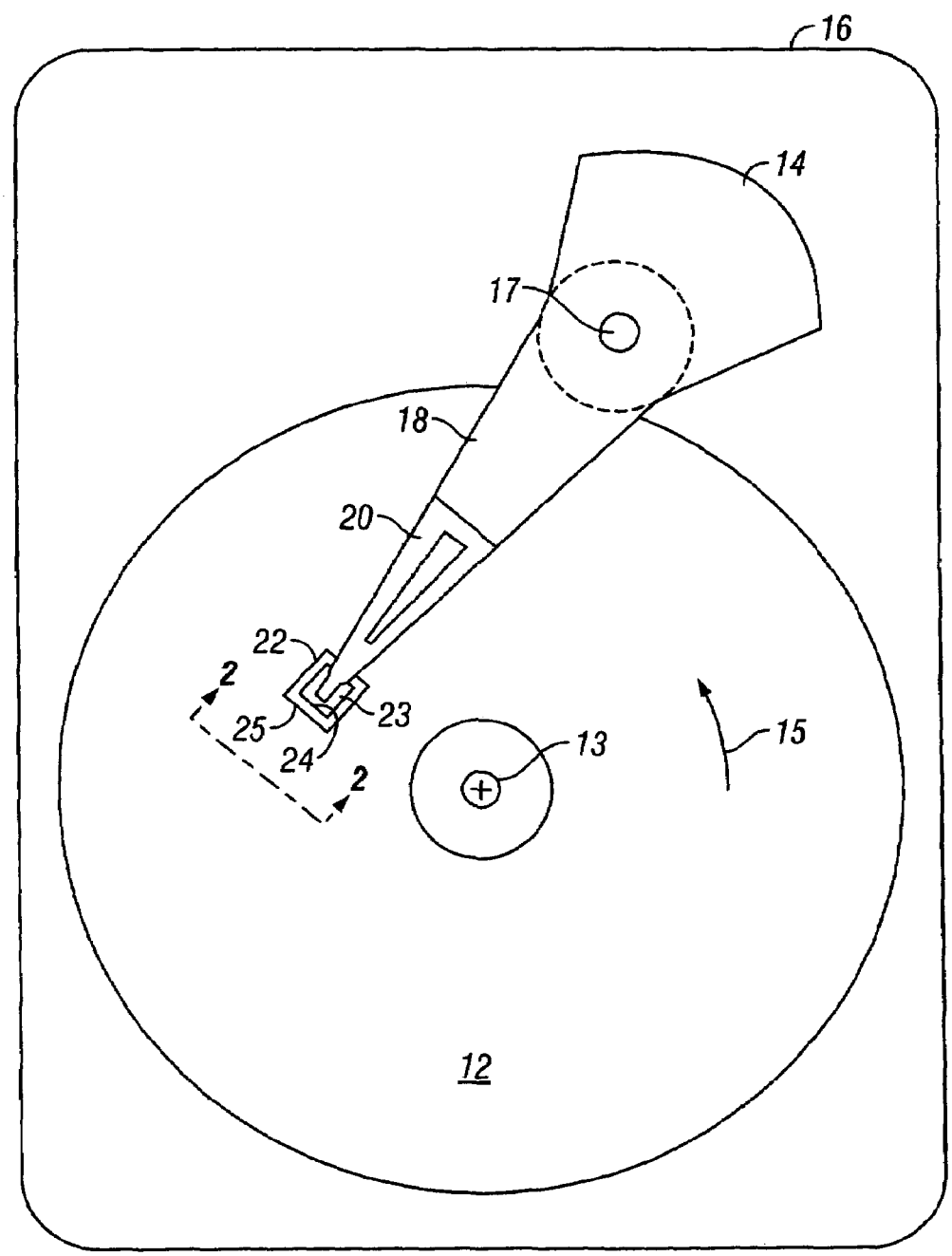
FIG. 1 is a schematic top view of a conventional magnetic recording hard disk drive according to the prior art with the cover removed.

FIG. 1 is a block diagram of a conventional magnetic recording hard disk drive. The disk drive includes a magnetic recording disk 12 and a rotary voice coil motor (VCM) actuator 14 supported on a disk drive housing or base 16. The disk 12 has a magnetic recording layer with a plurality of concentric data tracks. The disk 12 is rotated in direction 15 about rotational axis 13 by a spindle motor (not shown) mounted to base 16. The actuator 14 pivots about axis 17 and includes a rigid actuator arm 18. A generally flexible suspension 20 includes a flexure element 23 and is attached to the end of arm 18. A head carrier or air-bearing slider 22 is attached to the flexure 23. A magnetic recording read/write head 24 that typically includes an inductive write head and a magnetoresistive read head is formed on the trailing surface 25 of slider 22. The flexure 23 and suspension 20 enable the slider to "pitch" and "roll" on an air-bearing generated by the rotating disk 12. As the disk 12 rotates the actuator 14 can be rotated to move the read/write head 25 in a generally radial direction across the tracks so that different concentric data tracks on disk 12 can be accessed for reading or writing of data. Typically, there are multiple disks stacked on a hub that is rotated by the spindle motor, with a separate slider and read/write head associated with each disk surface.

Figure 2A:
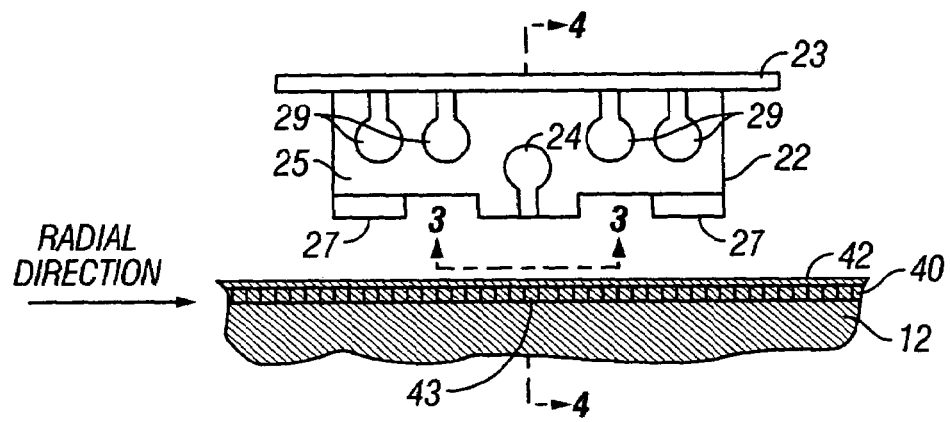
FIG. 2A is an enlarged end view of the slider and a section of the disk taken in the direction 2-2 in FIG. 1.

FIG. 2A is an enlarged end view of the disk drive head assembly and a section of the disk 12 taken in the direction 2-2 in FIG. 1. The head assembly includes the slider 22 and the read/write head 24 formed on the slider's trailing surface 25. The slider 22 is attached to flexure 23 and has an air-bearing surface (ABS) 27 facing the disk 12 and a trailing surface 25 generally perpendicular to the ABS and parallel to the radial or cross-track direction. The ABS 27 causes the airflow from the rotating disk 12 to generate a bearing of air that supports the slider 20 in very close proximity to or near contact with the surface of disk 12. The read/write head 24 is formed on the trailing surface 25 and is connected to the disk drive read/write electronics by electrical connection to terminal pads 29 on the trailing surface 25. The disk 12 has a magnetic recording layer 40 and a protective overcoat 42. The magnetic recording layer 40 is typically a continuous layer of magnetic recording material, such as a sputter-deposited cobalt (Co) alloy film. The inductive write head forms data tracks in the circumferential direction (into the paper in FIG. 2A) when write current through the write head generates magnetic fields as the disk 12 rotates. The cross-sections of a plurality of concentric data tracks are shown aligned in the radial direction in FIG. 2A, with the data track directly below read/write head 24 being identified as track 43.

Figure 2B:
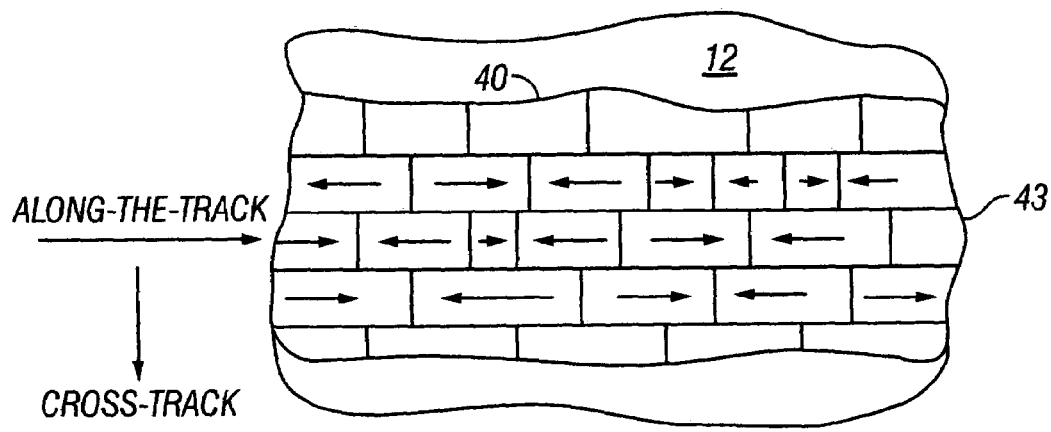
FIG. 2B is a top view of the magnetic recording disk in the prior art disk drive showing a portion of the continuous magnetic recording layer with three adjacent tracks.

FIG. 2B is a top view of disk 12 showing a portion of the magnetic recording layer with data track 43 and two adjacent tracks. Each of the data tracks has magnetized regions or magnetizations (represented by the arrows) in the plane of layer 40 and oriented in the circumferential or along-the-track direction. The recording layer 40 of magnetic material is called a continuous magnetic layer because the data tracks are not physically separated from one another and are not pre-formed in the layer 40, but are formed when the write fields from the write head create the magnetizations in the continuous magnetic layer.

Figure 3:
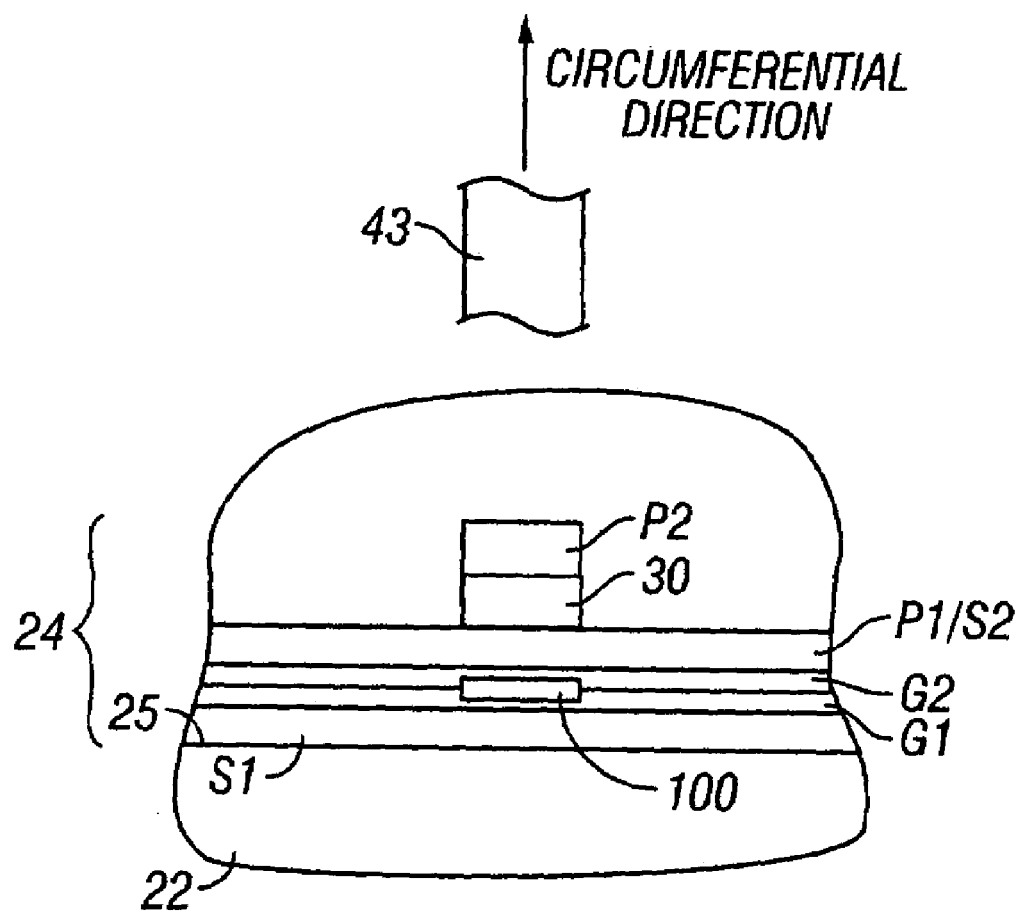
FIG. 3 is a view in the direction 3-3 of FIG. 2A and shows the ends of a conventional read/write head as viewed from the disk in the prior art disk drive.

FIG. 3 is a view in the direction 3-3 of FIG. 2A and shows the ends of read/write head 24 as viewed from the disk 12. The read/write head 24 is a series of thin films deposited and lithographically patterned on the trailing surface 25 of slider 22. The write head includes magnetic write poles P1/S2 and P1 separated by a write gap 30. When write current is directed to the write head a magnetic field is generated across the write gap 30 in a direction along the track 43. The magnetoresistive sensor or read head 100 is located between two insulating gap layers G1, G2 that are typically formed of alumina ($Al_2O_3$). Gap layers G1, G2 are located between magnetic shields S1 and P1/S2, with P1/S2 also serving as the first write pole for the write head. Because shield S2 also serves as the pole P1, this type of read/write head 24 is known as a "merged" head. If S2 and P1 are separate layers the read/write head is known as a "piggyback" head. The shields are typically formed of a NiFe alloy and the write poles are typically formed of a plated NiFe or CoFe alloy.

Figure 4:
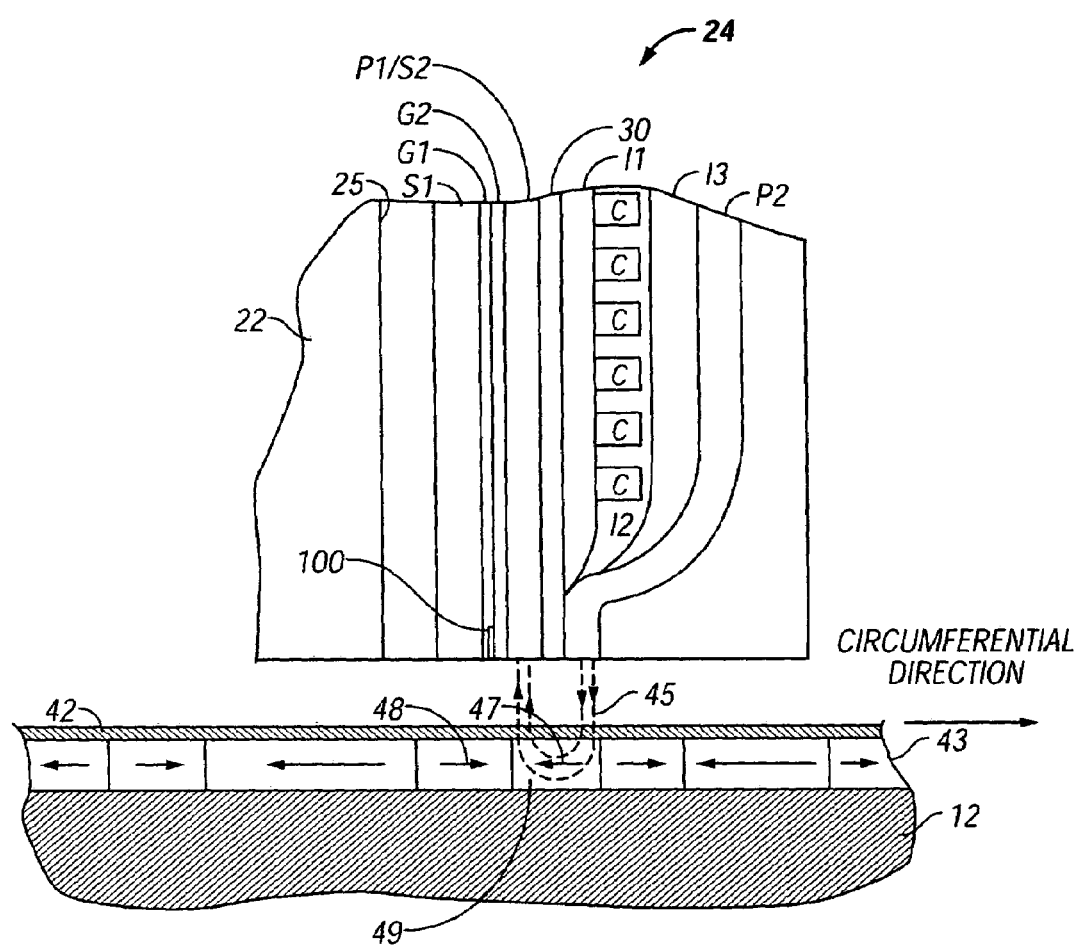
FIG. 4 is a view in the direction 4-4 of FIG. 2A and shows a section of a conventional read/write head and the disk in a circumferential or along-the-track direction in the prior art disk drive.

FIG. 4 is an enlarged sectional view of section 4-4 of FIG. 2A and shows read/write head 24 and a portion of disk 12 in the circumferential or along-the-track direction. FIG. 4 also shows the sections of the write head coil layer C, typically copper (Cu), and insulating layers I1, I2 and I3, typically alumina, that are located between the write poles P1, P2. When write current is applied to the coil a magnetic write field 45 is generated across the write gap 30 between write poles P1 and P2. The ends of the poles P1, P2 that face the disk 12 are called the pole tips. The write field 45 magnetizes regions of the data tracks in the circumferential or along-the-track direction, as shown by the arrows representing the magnetizations, such as magnetization 47 in track region 49. The magnetizations in data track 43 are in the plane of the recording layer 40 and the transitions between adjacent magnetizations, such as the transition between adjacent magnetizations 47 and 48, are detectable by the read head as data "bits".

Figure 5A:
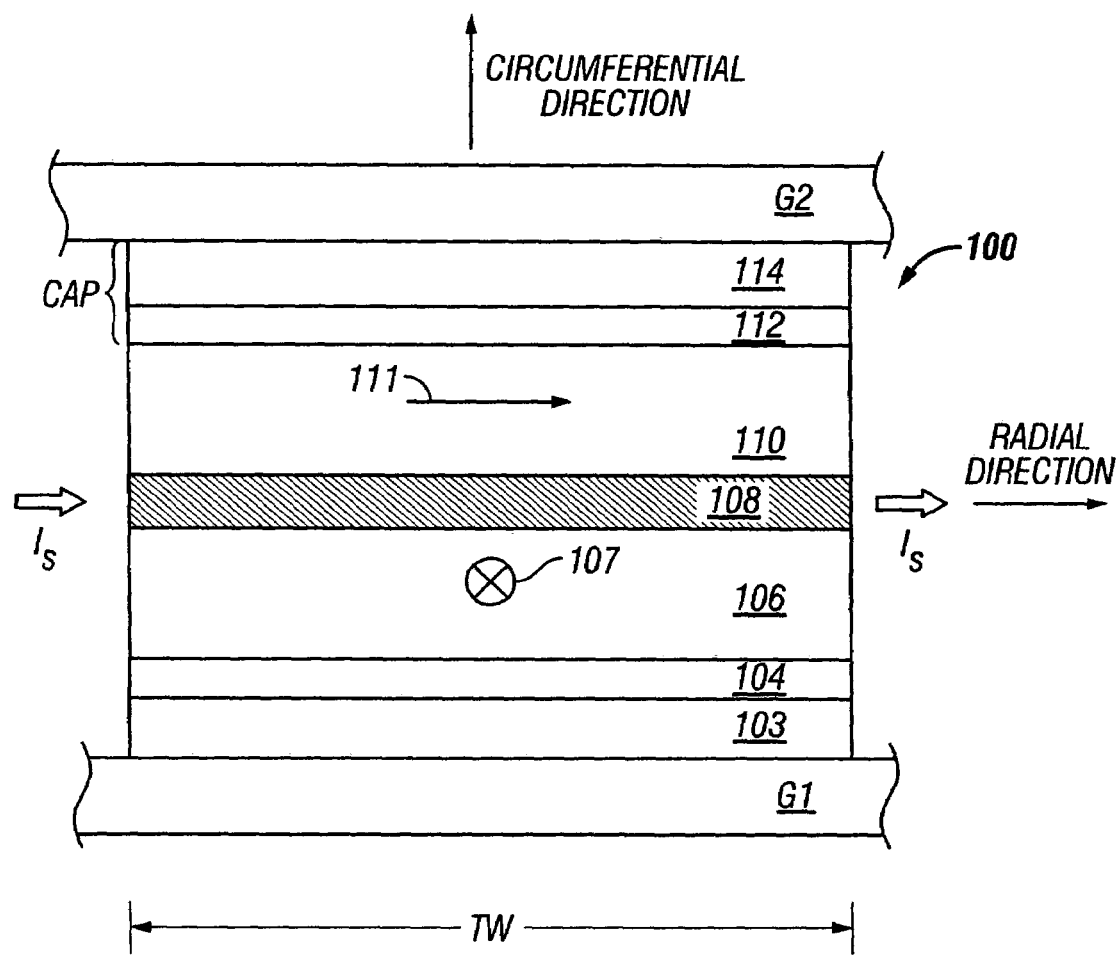
FIG. 5A is an enlarged sectional view showing the stack of layers making up a conventional magnetoresistive read head in the prior art disk drive.

FIG. 5A is an enlarged sectional view showing the stack of layers making up magnetoresistive read head 100. Read head 100 may be a conventional giant magnetoresistance (GMR) spin-valve head that includes a stack of layers formed between the two insulating gap layers G1, G2 that are typically an oxide such as alumina. The layers include a pinned ferromagnetic layer 106 having a fixed or pinned magnetic moment or magnetization direction 107 oriented transversely (into the page), a free ferromagnetic layer 110 having a magnetic moment or magnetization direction 111 that can rotate in the plane of free layer 110 in response to transverse external magnetic fields, and a nonmagnetic electrically-conductive spacer layer 108 between the pinned layer 106 and free layer 110. The pinned layer 106 is exchange-coupled with an antiferromagnetic (AFM) layer 104 that is formed on a suitable underlayer or seed layer 103. Thus the magnetization direction 107 of pinned layer 106 is fixed and will not rotate in the presence of an external magnetic field in the range of interest, i.e., magnetic fields from recorded data on the disk 12. The width of the free layer 110 generally defines the data track width (TW). With a sense current $I_S$ applied generally in the planes of the free layer 110 and pinned layer 106 from electrical leads (not shown) connected at the edges of the read head, the rotation of the free-layer magnetization 111 relative to the pinned-layer magnetization 107, due to the magnetic fields from the disk, is detectable as a change in electrical resistance. The operation of the read head to detect magnetic fields from the disk is shown schematically in the perspective view of FIG. 5B. The free layer 110 has its magnetization direction 111 oriented generally parallel to the ABS and the surface of the disk above the data track 43 in the absence of an applied magnetic field. The two adjacent magnetic transitions 47, 48 in the plane of the magnetic recording layer and along-the-track create a magnetic field H out of the plane of the disk and generally orthogonal to free-layer magnetization direction 111. This field will cause the magnetization direction 111 to rotate in the plane of free layer 110 either "up" or "down" from the disk, depending on the direction of field H, as shown by the dashed arrows.

The read head 100 described above is a current-in-the plane (CIP) spin valve (SV) read head because the sense current $I_S$ is directed in the planes of the free and pinned layers. However, the read head 100 may be a current-perpendicular-to-the-plane (CPP) read head that has the sense current directed $I_S$ directed generally perpendicularly through the planes of the free and pinned layers. The read head 100 described above is a GMR read head because the nonmagnetic spacer layer 108 is electrically conductive. However, the read head may also be a well-known magnetic tunnel junction (MTJ) magnetoresistive read head, in which case the spacer layer is an electrically-insulating tunnel barrier, typically alumina. An MTJ read head is also a CPP read head.

Figure 5B:
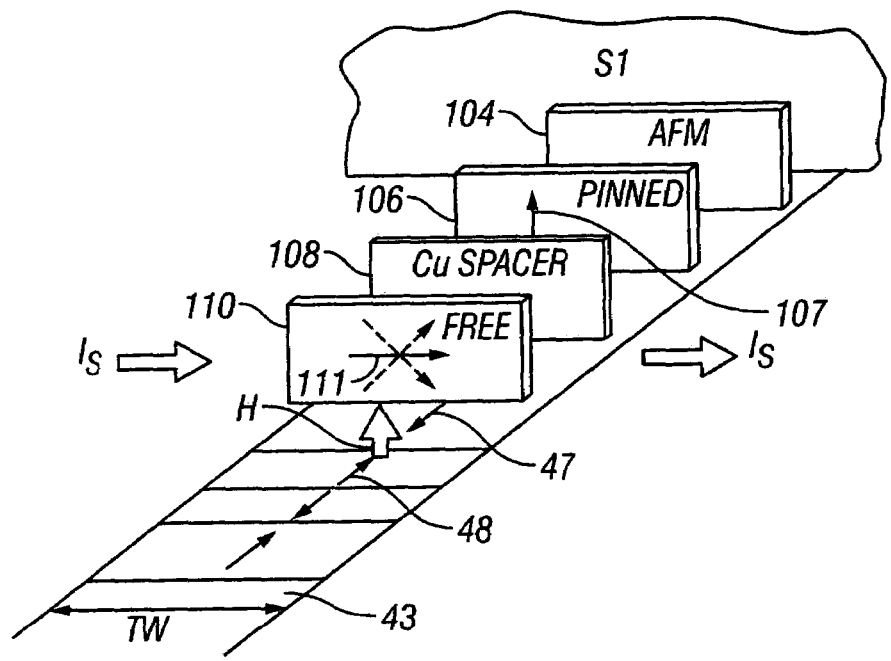
FIG. 5B is a perspective exploded view of a conventional magnetoresistive read head and a data track for showing schematically the operation of the read head to detect magnetic fields from the disk in the prior art disk drive.

While the pinned layer 106 is shown in FIGS. 5A-5B as a single layer it can also be the well-known antiparallel-pinned (AP-pinned) structure, also called a "laminated" pinned layer, as described in U.S. Pat. No. 5,465,185. The AP-pinned structure minimizes magnetostatic coupling of the pinned layer 106 with the free layer 110, and comprises a ferromagnetic pinned layer and a ferromagnetic reference layer separated by a non-magnetic antiferromagnetically-coupling spacer layer such as Ru, with the ferromagnetic pinned layer being exchange coupled to the antiferromagnetic layer 104. The pinned layer 106 can also be a "self-pinned" laminated structure, as described in U.S. Pat. No. 5,583,725, or a layer of relatively high-coercivity or "hard" magnetic material, such as CoPt, in which case the antiferromagnetic layer 104 is not required.

The seed layer 103 is typically one or more layers of NiFeCr, NiFe, Ta or Ru. The AFM layer 104 is a typically a Mn alloy, e.g., PtMn, NiMn, FeMn, IrMn, PdMn, PtPdMn or RhMn. The pinned layer 106 and free layer 110 are typically formed of an alloy of one or more of Co, Fe and Ni, or a bilayer of two alloys, such as a CoFe—NiFe bilayer. The spacer layer 108 is typically Cu.

The Invention

The invention is a magnetic recording disk drive similar to the above-described prior art disk drive. However, the disk drive of this invention has a disk with the magnetizations in the recording layer oriented in the cross-track direction, a write head capable of writing the cross-track magnetizations, and a read head capable of reading the cross-track magnetizations.

Figure 6A:
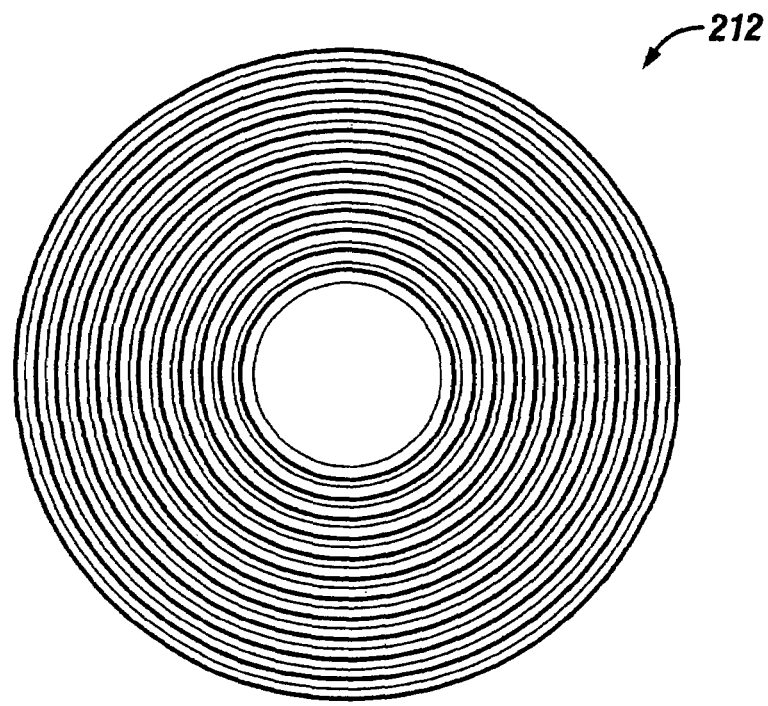
FIG. 6A is a top view of the disk for the disk drive of this invention showing the concentric data tracks and interleaved concentric guard bands.

FIG. 6A is a top view of the disk 212 in the disk drive of this invention. The disk 212 has a plurality of concentric data tracks containing magnetic material and a plurality of interleaved concentric guard bands, with the guard bands being located between radially adjacent tracks and magnetically separating the tracks. In a typical magnetic recording disk, the data tracks may have a radial width on the order of tens of nanometers and the guard bands a width of around one-tenth the data track width. Thus FIG. 6A is clearly not to scale but is intended merely to show how the concentric data tracks are separated by the concentric guard bands.

Figure 6B:
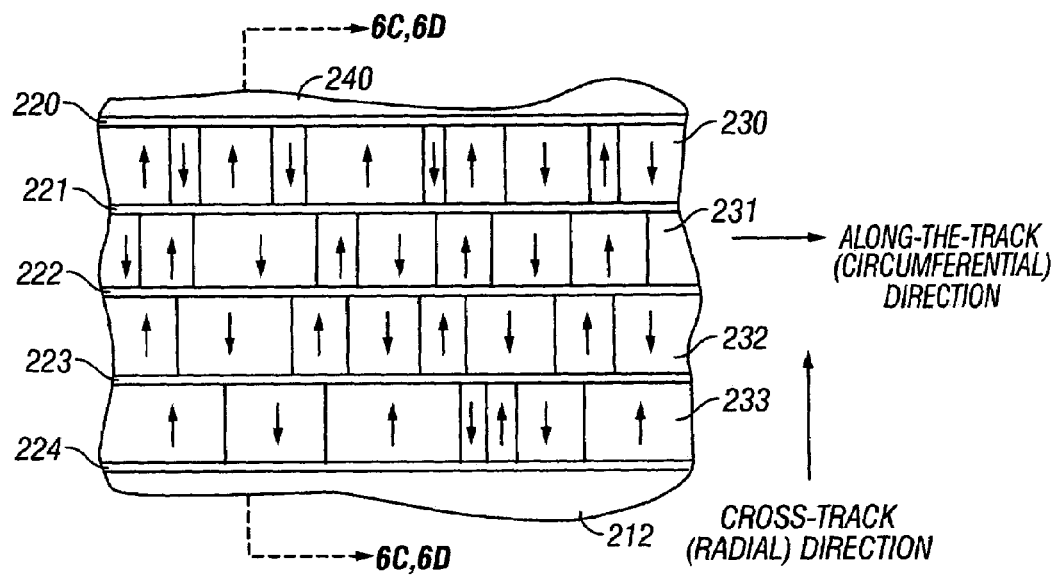
FIG. 6B is an expanded view of a section of the disk in FIG. 6A showing portions of typical data tracks and typical guard bands.

FIG. 6B is an expanded view of a section of the disk 212 and shows typical data tracks 230-233 in the magnetic recording layer 240 and typical guard bands 220-224 between the data tracks. In one example of a 2.5 inch diameter disk, the radial track density is approximately $230 \times 10^3$ tracks per inch (tpi), with each track having a radial width of approximately 100 nm and each guard band having a radial width of approximately 10 nm. As shown in FIG. 6B, after the data tracks have been written by the write head in the disk drive of this invention, they contain magnetic regions or magnetizations oriented in the cross-track or radial direction, as shown by the arrows.

The disk 212 may be a discrete-track disk, i.e., one in which the guard bands are nonmagnetic. The term "nonmagnetic" means that the guard band is not capable of generating a magnetic field that is detectable by the read head. Discrete-track magnetic recording disks are known in the art. In a discrete-track disk, the nonmagnetic guard bands may be gaps or grooves, or formed of nonmagnetic material, or contain magnetic material but have surfaces so far below the surfaces of the data tracks as to not generate a detectable signal to the read head. Discrete-track disks may be formed by any of the processes used in making patterned media, i.e., magnetic recording disks in which the individual data bits, not just the individual data tracks, are patterned on the disk as discrete magnetic regions separated from one another by nonmagnetic regions. U.S. Pat. No. 5,768,075 is one of many references describing patterned magnetic recording disks.

Figure 6C:
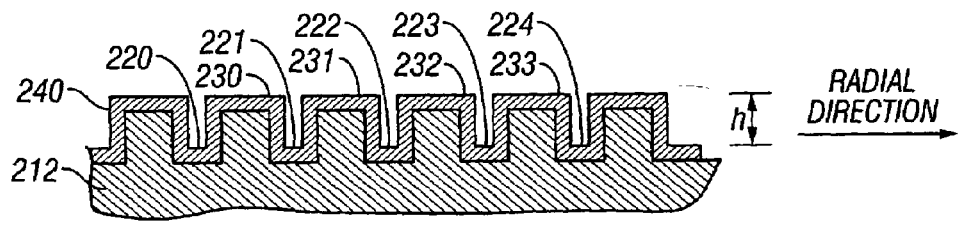
FIG. 6C is a sectional view taken along the radial direction of a portion of a discrete-track disk for the disk drive of this invention in which the guard bands have upper surfaces recessed from the upper surfaces of the data tracks.

FIG. 6C is a sectional view of a portion of a discrete-track disk 212 in which the upper surfaces of the guard bands 220-224 are recessed or located a distance h below the upper surfaces of the data tracks 230-233. The grooves in the disk in FIG. 6C are formed by molding, machining or etching, after which a layer of magnetic recording material 240 is deposited over the entire surface, including the upper surfaces of the grooves and data tracks. However, even if regions of the magnetic layer in the groves become magnetized, no signal is detected by the head because of the spacing h. Thus the grooves provide magnetic separation between adjacent data tracks. A discrete-track disk similar to that shown in FIG. 6C is described in U.S. Pat. No. 5,590,009, and a patterned disk with recessed nonmagnetic regions made by ion irradiation of the disk substrate is described in U.S. Pat. No. 6,440,520.

Figure 6D:
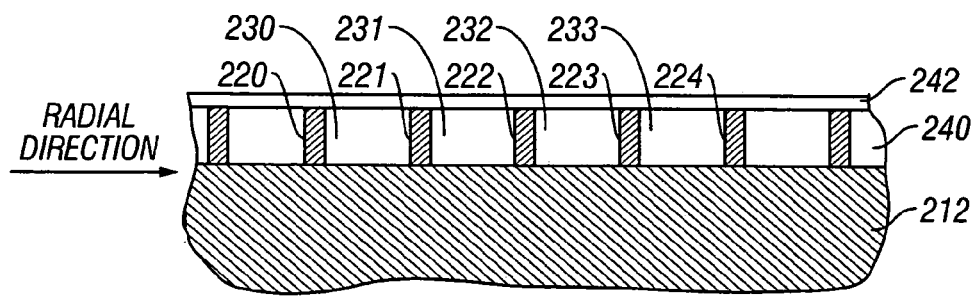
FIG. 6D is a sectional view taken along the radial direction of a portion of a discrete-track disk for the disk drive of this invention in which the guard bands and data tracks have continuous substantially coplanar upper surfaces.

The discrete-track disk may also have a continuous upper surface, in which the upper surfaces of the guard bands and data tacks are substantially coplanar, as shown in FIG. 6D.

In this type of disk, the guard bands may be formed of nonmagnetic material, such as a nonmagnetic oxide. The guard bands may also be formed of substantially the same magnetic material as the data tracks, but the guard bands are rendered nonmagnetic by one or more processes, such as ion implantation or ion irradiation through a patterned mask. This view also shows the protective disk overcoat 242 over both the guard bands and data tracks. An ion irradiation process for forming patterned media is described in U.S. Pat. No. 6,383,598.

Figure 7A:
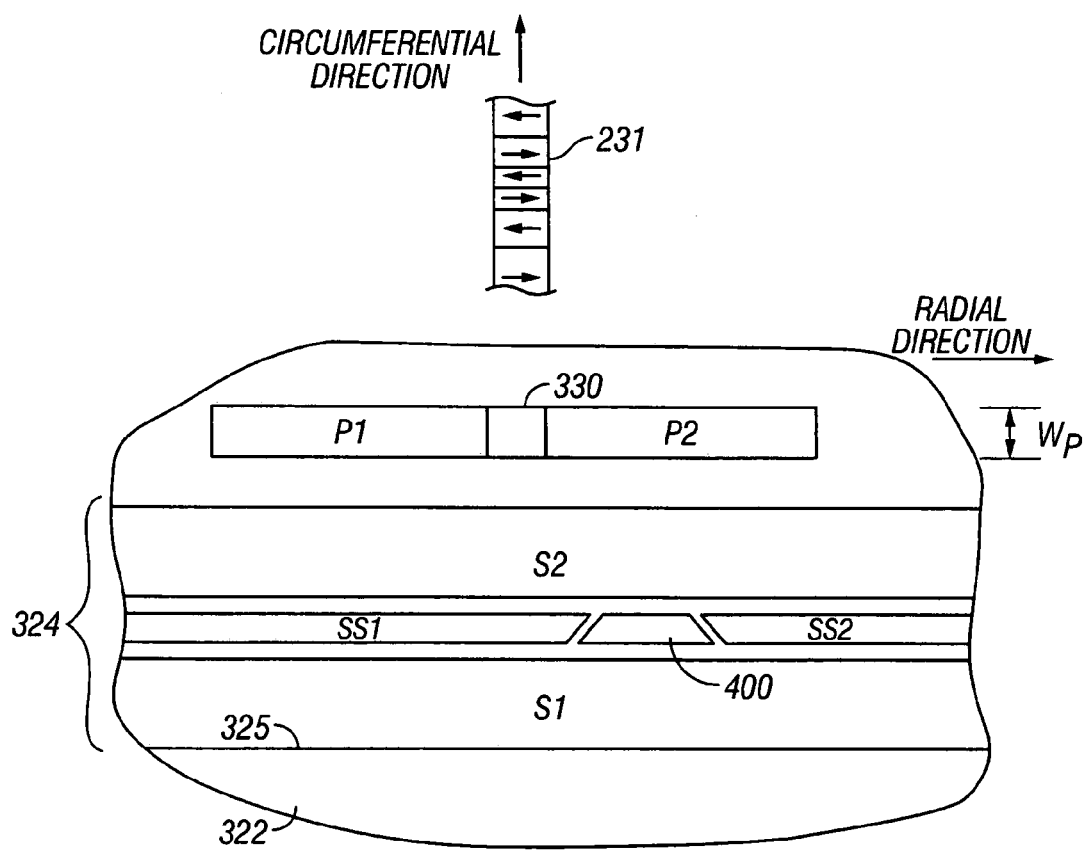
FIG. 7A is a view taken from the disk of a read/write head for reading and writing the cross-track magnetizations on the discrete-track disk of FIG. 6B.

The head assembly for use with the discrete-track disk of FIG. 6B includes the head slider 322 and the read and writes heads formed on the slider's trailing surface 325, as shown in FIG. 7A. The read/write head 324 is formed on the trailing surface 325 of a head carrier, such as a slider 322. The write head is an inductive write head that has an electrically conductive coil coupled to a magnetic yoke that has two write poles separated by a write gap. When write current passes through the coil a magnetic field is induced across the write gap. As shown in FIG. 7A, in this invention the write poles P1, P2 and the write gap 330 lie in substantially the same plane, which is parallel to the slider's trailing surface 325 and thus parallel to the cross-track direction. A magnetic field across the write gap 330 is oriented in a cross-track direction substantially parallel to the slider's trailing surface 325 and creates the cross-track magnetizations in the data tracks. A portion of a data track 231 is depicted in FIG. 7A merely to show the relationship of the poles P1, P2 and write gap 330 to a data track. The thickness or width of the write poles ($W_P$) can be significantly wider than the shortest magnetization in the along-the-track direction because writing occurs at the trailing edges of the poles P1, P2. The strength of the write field applied to the recording layer increases with increasing thickness of the write poles.

Figure 7B:
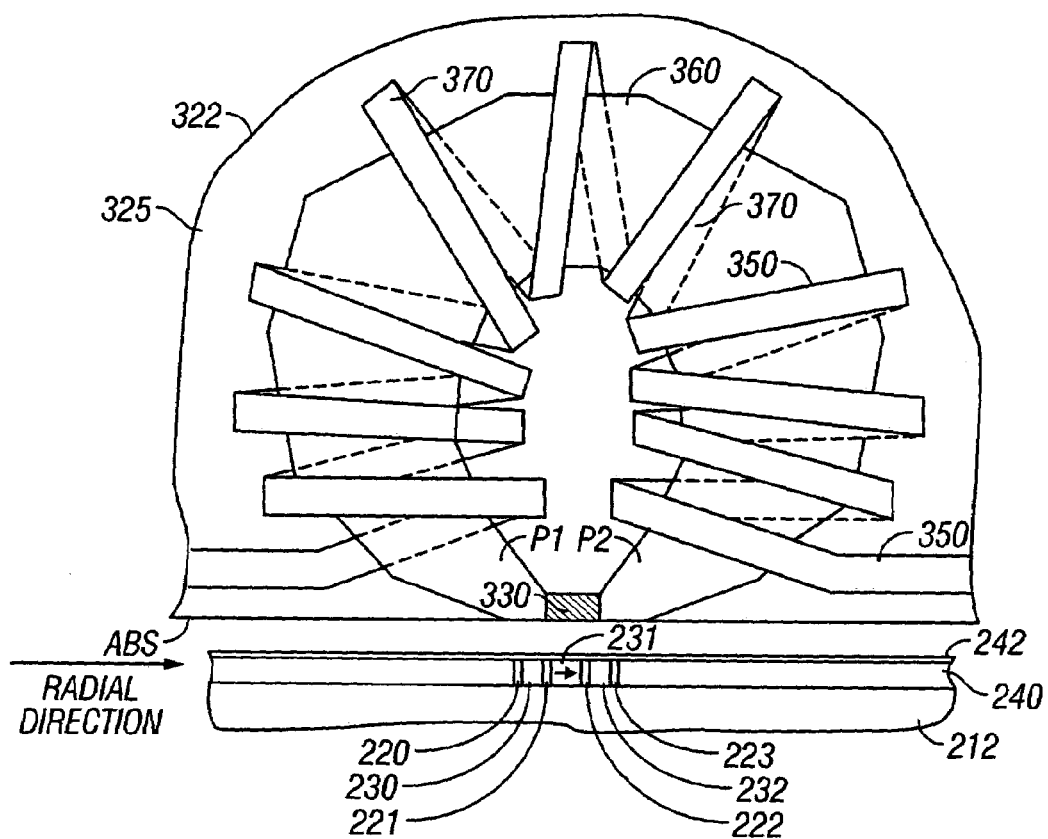
FIG. 7B is a view facing the trailing surface of the slider and showing a first embodiment of the write head of FIG. 7A with the disk in sectional view.

FIG. 7B is a view facing the trailing surface 325 of the slider 322 with the disk 212 in sectional view, and shows a first embodiment of a write head formed on the slider's trailing surface. The write head includes a first patterned copper layer 350, a patterned yoke 360, and a second patterned copper layer 370; all formed by conventional lithographic patterning and deposition processes. Each copper layer 350, 370 includes a set of coil segments that are connected at their ends to form a complete coil that wraps around or surrounds the intermediate yoke 360, so that when write current is generated through the coil a magnetic field is generated across the write gap 330 by the write poles P1, P2. The ends or tips of poles P1, P2 lie substantially in the plane of the ABS slider 322 and face the disk 212. The write field is in the plane of the poles P1, P2 parallel to the slider trailing surface 325 and thus creates the cross-track magnetization in the data track 231 just beneath the write gap 330.

Figure 7C:
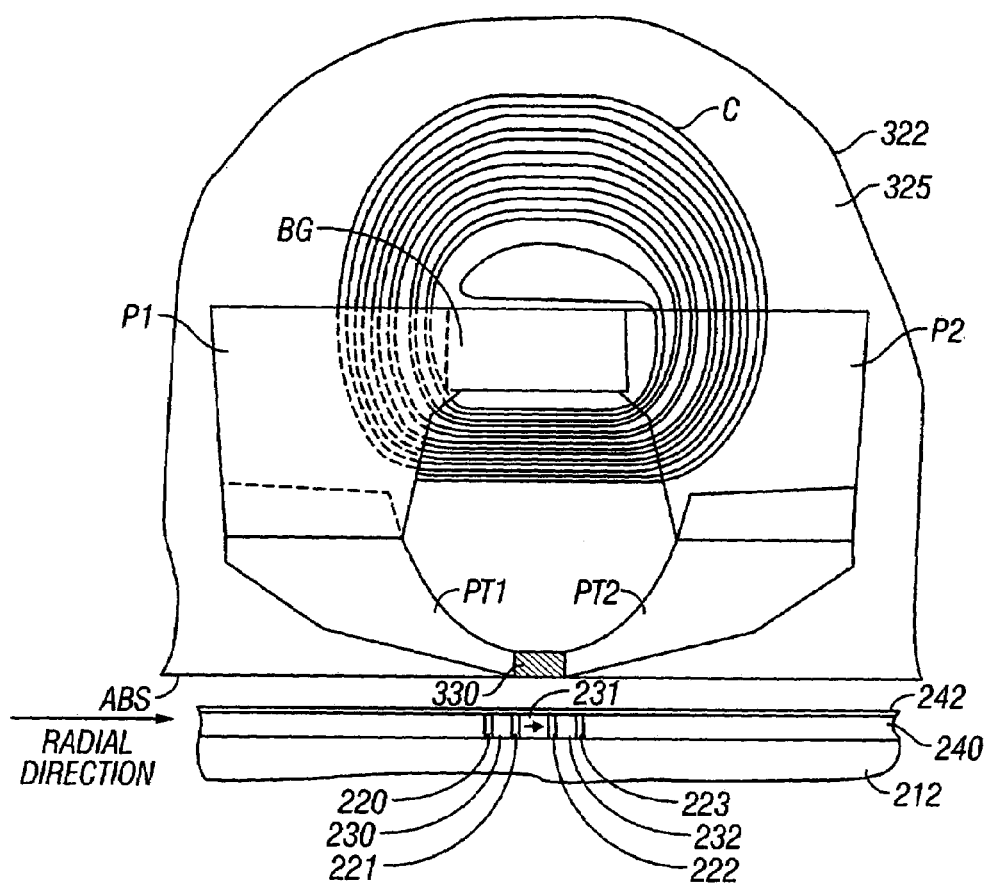
FIG. 7C is a view facing the trailing surface of the slider and showing a second embodiment of the write head of FIG. 7A with the disk in sectional view.

FIG. 7C is a view facing the trailing surface 325 of the slider 322 with the disk 212 in sectional view, and shows a second embodiment of a write head formed on the slider's trailing surface. Pole portion P2 that includes a back gap BG region is plated onto surface 325 and planarized by chemical-mechanical-polishing (CMP). The pole tips PT1 and PT2 are then deposited, with PT2 making contact with P2. A conventional single layer coil C having a generally spiral pattern is plated onto surface 325 with a portion of the coil overlapping P2. Pole portion P1 is then plated over a portion of the coil C to make contact with PT1 and BG. P1 and P2 are electrically insulated from contact with coil C. The connected P1 and P2 with their respective pole tips PT1 and Pt2 form a yoke through which the coil C passes, so that when write current passes through the coil C, a magnetic field is induced across the write gap 330.

The write heads shown in FIGS. 7B and 7C are examples of a write head fabricated on the end of a slider with the write poles and write gap lying in substantially the same plane parallel to the slider's trailing surface so that the write field is in the cross-track direction, but other write head structures are possible.

Figure 8:
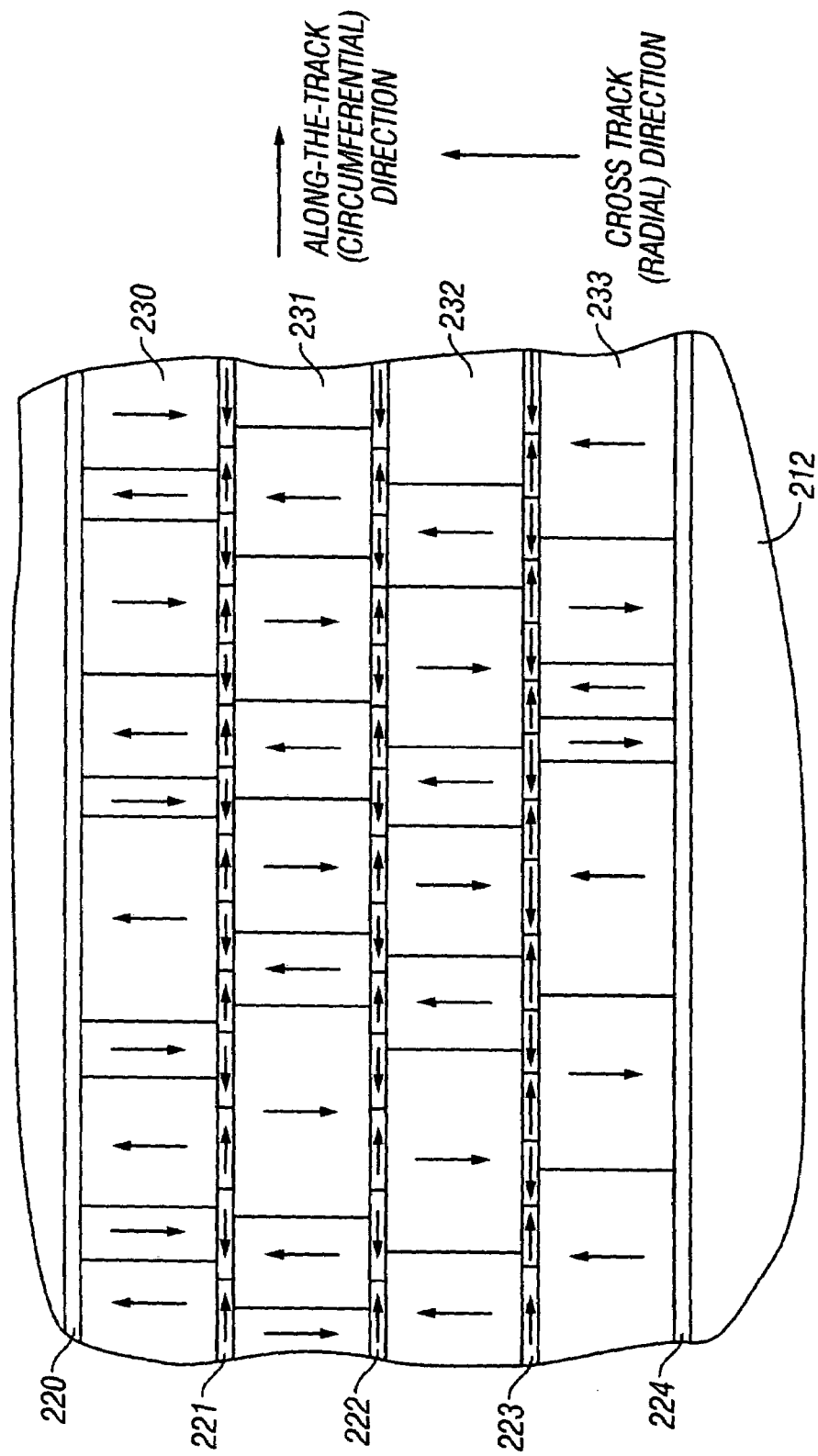
FIG. 8 is a top view of a portion of a disk for the disk drive of this invention with a continuous layer of magnetic material with guard bands having magnetizations in the along-the-track direction.

Instead of a discrete-track type of disk, the disk 212 may have magnetic guard bands formed of the same magnetic material as the data tracks. In this type of disk, the recording layer is a continuous layer of magnetic material over the disk, but regions of this material in the guard bands have magnetizations in the circumferential or along-the-track direction. FIG. 8 shows this type of disk with three guard bands 221, 222, 223 and two data tracks 231, 232. These guard band magnetizations are formed by a write head that has an erase pole, so that during the application of write current to the write head the erase pole creates erase bands of magnetic material between the data tracks. These erase bands magnetically separate the adjacent data tracks that have the cross-track magnetizations.

Figure 9A:
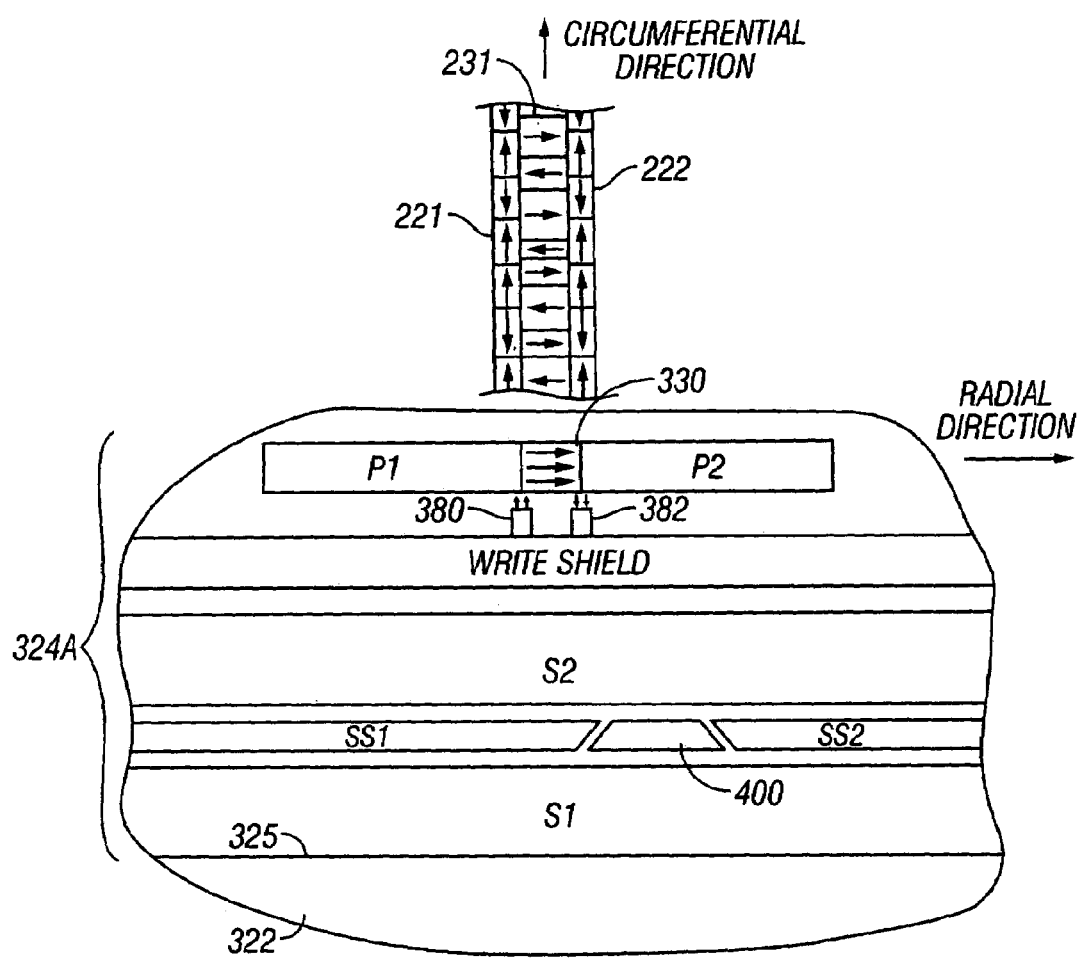
FIGS. 9A and 9B show two embodiments, respectively, of a write head with an erase pole for creating the cross-track magnetizations in the data tracks and the along-the-track magnetizations in the guard bands in the disk of FIG. 8.
Figure 9B:
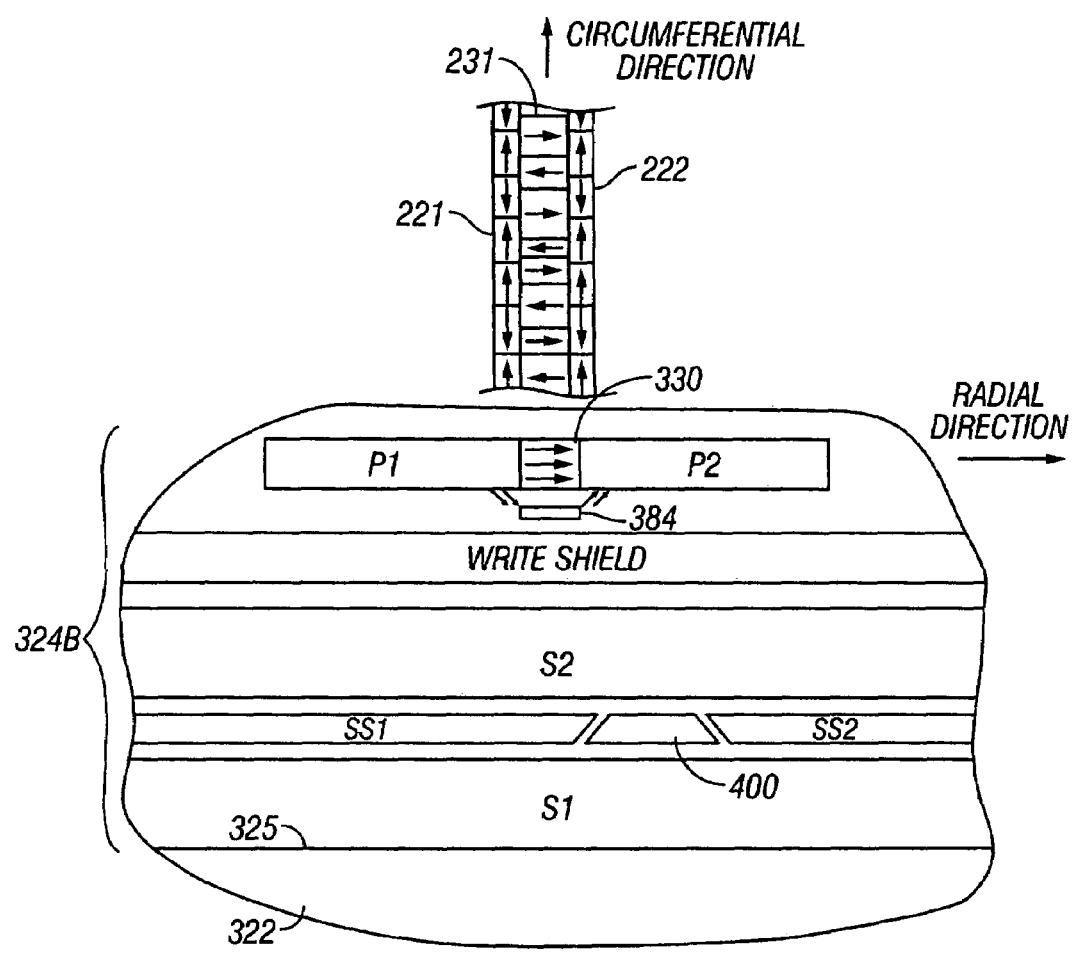

FIGS. 9A and 9B show two embodiments of a write head with an erase pole for creating the cross-track magnetizations in the data tracks and the erase bands that serve as the guard bands. In FIG. 9A, the read/write head 324A includes a write head with the two write poles P1, P2 separated by gap 330, but also an erase pole in the form of two side erase poles 380, 382. The erase poles 380, 382 extend in the circumferential or along-the-track direction from a write shield. The erase poles are spaced apart in the radial direction on the write shield by approximately the width of the write gap 330. Each pole is spaced from a respective write pole, with write pole P1 and erase pole 380 defining an erase gap, and write pole P2 and erase pole 382 defining an erase gap. When write current is applied to the coil a write field is created across write gap 330 and erase fields are created across the two erase gaps, as represented by the arrows in the gaps. A portion of a data track 231 with adjacent guard bands 221, 222 is depicted on FIG. 9A for illustrating the manner in which the erase fields create the erase bands with along-the-track magnetizations that serve as the guard bands 221, 222 to magnetically separate data track 231 from adjacent data tracks.

In the embodiment of FIG. 9B, the read/write head 324B includes a write head with the two write poles P1, P2 separated by gap 330, but also an erase pole in the form of a single common erase pole 384. The erase pole 384 is a "floating" pole not attached to the write shield and is aligned radially with write gap 330 but spaced circumferentially from write gap 330. Each end of erase pole 384 is spaced from a respective write pole to form the two erase gaps. When write current is applied to the coil a write field is created across write gap 330 and erase fields are created across the two erase gaps, as represented by the arrows in the gaps. A portion of a data track 231 with adjacent guard bands 221, 222 is depicted on FIG. 9B for illustrating the manner in which the erase fields create the erase bands with along-the-track magnetizations that serve as the guard bands 221, 222 to magnetically separate data track 231 from adjacent data tracks. The write head with the single erase pole 384 also improves the writability, i.e, the ability to switch the cross-track magnetizations. This is because the erase fields between the write poles P1, P2 and the ends of the erase pole 384 are generally orthogonal to the cross-track magnetizations, as shown by the field arrows in FIG. 9B. These orthogonal fields create a torque on the cross-track magnetization that assists the write field from poles P1, P2 in switching the cross-track magnetization.

The magnetoresistive read head for reading the cross-track magnetizations is shown as item 400 in FIG. 7A. The read head 400 is located between two magnetic shields S1, S2 that are spaced from it in the circumferential direction, as in conventional read head structures (FIG. 3). However, the read head 400 is also located between two magnetic side shields SS1, SS2 that are spaced from it in the radial direction. When a data track is being read the side shields prevent magnetic flux from adjacent data tracks from reaching the read head.

Figure 10A:
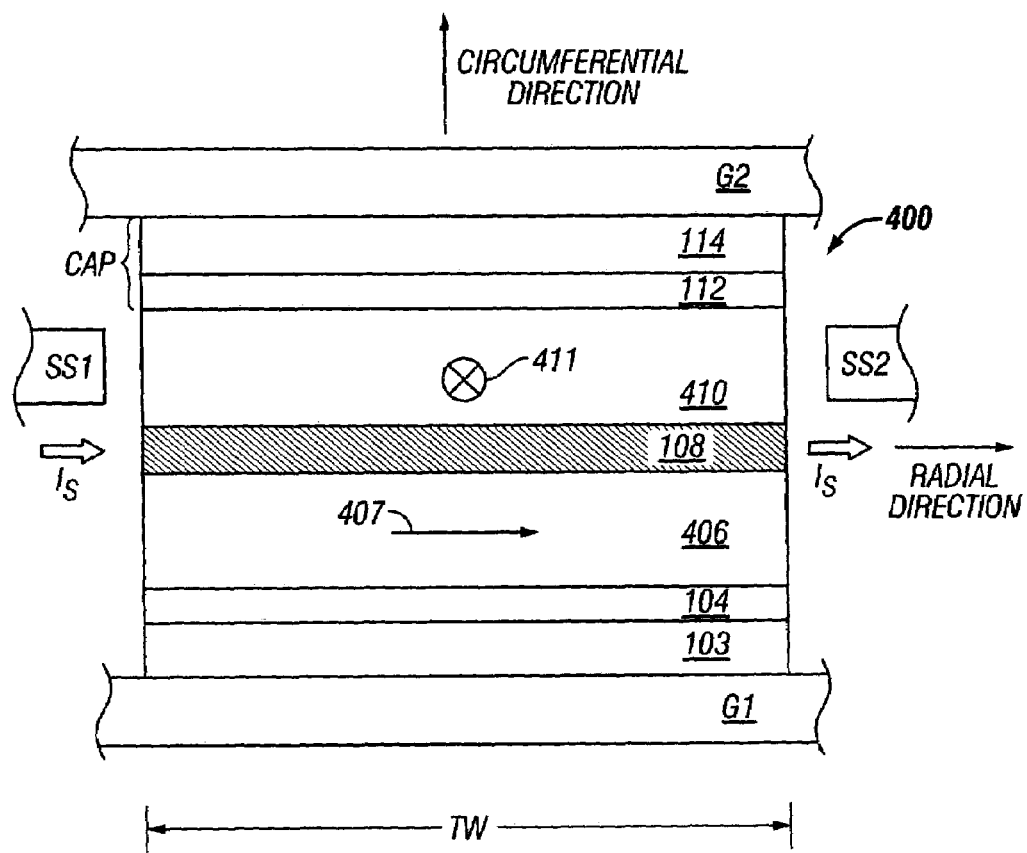
FIG. 10A is an enlarged sectional view showing the stack of layers making up the magnetoresistive read head in the disk drive of this invention.

FIG. 10A is an enlarged sectional view showing the stack of layers making up the magnetoresistive read head 400. The read head 400 is similar in structure to the conventional read head 100 (FIG. 5A). However, in read head 400 the free ferromagnetic layer 410 has its in-plane magnetization direction 411 oriented substantially perpendicular to the slider's disk-facing surface (the ABS) in the absence of an external magnetic field and substantially free to rotate in the presence of magnetic fields from the cross-track magnetizations in the data tracks. The pinned ferromagnetic layer 406 has its in-plane magnetization direction 407 oriented substantially parallel to the ABS and pinned by antiferromagnetic layer 104 so that it does not rotate in the presence of magnetic fields from the cross-track magnetizations.

Figure 10B:
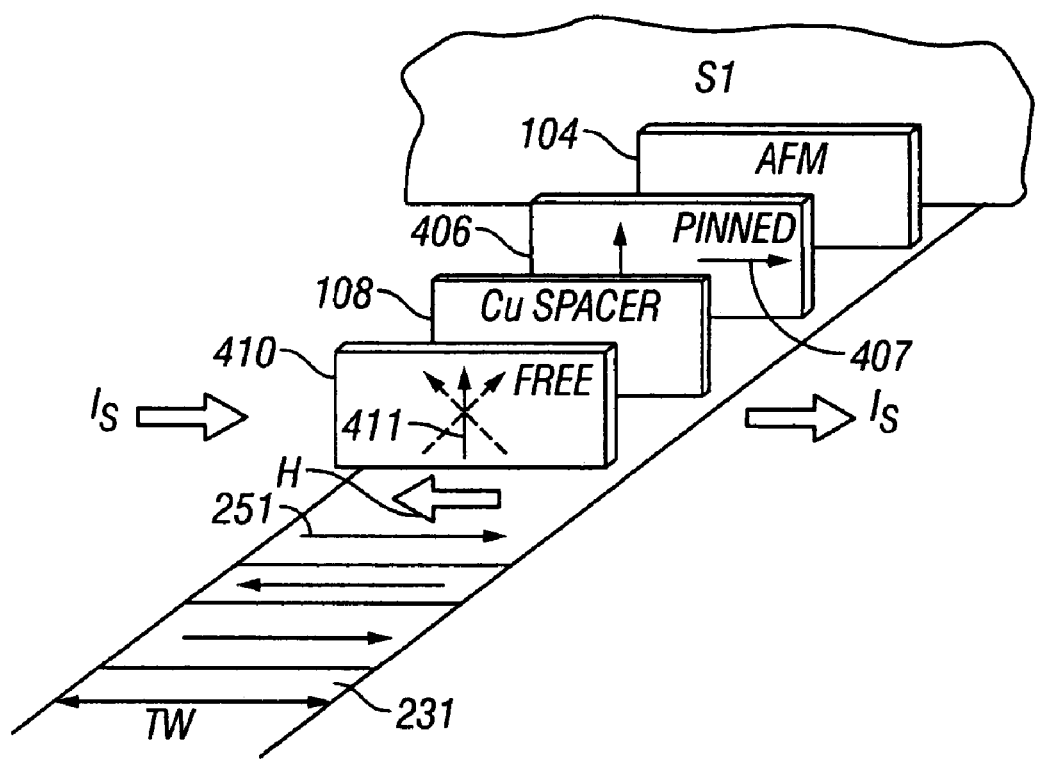
FIG. 10B is a perspective exploded view of the magnetoresistive read head and a data track for showing schematically the operation of the read head to detect the cross-track magnetizations in the disk in the disk drive of this invention.

FIG. 10B is a perspective exploded view of the magnetoresistive read head and a data track for showing schematically the operation of the read head 400 to detect the cross-track magnetizations. The free layer 410 has its magnetization direction 411 oriented generally perpendicular to the surface of the disk above the data track 231 in the absence of an applied magnetic field. The cross-track magnetization 251 below free layer 410 creates a magnetic field H parallel to the ABS and generally orthogonal to the free-layer magnetization direction 411. This field will cause the magnetization direction 411 to rotate in the plane of free layer 410, depending on the direction of field H, as shown by the dashed arrows. With sense current $I_S$ passing through the read head, this rotation of the free-layer magnetization direction 411 relative to the pinned layer magnetization 407, due to the magnetic fields from the cross-track magnetizations in the data tracks, is detectable as a change in electrical resistance.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A disk drive head assembly comprising:
a head carrier having a surface for facing the disk and a trailing surface substantially orthogonal to the disk-facing surface; and
a magnetoresistive read head formed on the trailing surface, the magnetoresistive read head comprising a free ferromagnetic layer having an in-plane magnetization direction oriented substantially perpendicular to the disk-facing surface in the absence of an external magnetic field and substantially free to rotate in the presence of a magnetic field, a pinned ferromagnetic layer having an in-plane magnetization direction oriented substantially parallel to the disk-facing surface, and a nonmagnetic spacer layer between the free and pinned layers.

2. The head assembly of claim 1 wherein the free layer has first and second ends defining a width in a direction substantially parallel to the disk-facing surface, and wherein the magnetoresistive read head further comprises first and second side shields of magnetically permeable material, each side shield being located at a corresponding free layer end.

3. The head assembly of claim 1 wherein the magnetoresistive read head is a current-in-the-plane (CIP) read head.

4. The head assembly of claim 1 wherein the magnetoresistive read head is a current-perpendicular-to-the-plane (CPP) read head.

5. The head assembly of claim 4 wherein the magnetoresistive read head is a magnetic tunnel junction (MTJ) read head and the nonmagnetic spacer layer is an electrically insulating tunnel barrier.

6. The head assembly of claim 1 further comprising an inductive write head on the trailing surface.

7. A disk drive head assembly comprising:
a head carrier having a surface for facing the disk and a trailing surface substantially orthogonal to the disk-facing surface; and
a magnetoresistive read head formed on the trailing surface, the magnetoresistive read head comprising a free ferromagnetic layer having first and second ends defining a width in a direction substantially parallel to the disk-facing surface and an in-plane magnetization direction oriented substantially perpendicular to the disk-facing surface in the absence of an external magnetic field and substantially free to rotate in the presence of a magnetic field, a pinned ferromagnetic layer having an in-plane magnetization direction oriented substantially parallel to the disk-facing surface, a nonmagnetic spacer layer between the free and pinned layers, and first and second side shields of magnetically permeable material, each side shield being located at a corresponding free layer end.

8. The head assembly of claim 7 wherein the magnetoresistive read head is a current-in-the-plane (CIP) read head.

9. The head assembly of claim 7 wherein the magnetoresistive read head is a current-perpendicular-to-the-plane (CPP) read head.

10. The head assembly of claim 9 wherein the magnetoresistive read head is a magnetic tunnel junction (MTJ) read head and the nonmagnetic spacer layer is an electrically insulating tunnel barrier.

11. The head assembly of claim 7 further comprising an inductive write head on the trailing surface.

* * * * *